United States Patent [19]

Herrmann et al.

[11] 3,747,486

[45] July 24, 1973

[54] LIGHT-OPTICAL APPARATUS FOR DRAFTING VERY SMALL FIGURES WITH VERY FINE LINE WIDTHS AND/OR EXTREMELY SHORT LINE LENGTHS

[75] Inventors: Kurt Herrmann; Kornelius Noss, Munich, both of Germany

[73] Assignee: Siemens Aktiengesellschaft, Berlin & Munich, Germany

[22] Filed: Mar. 9, 1972

[21] Appl. No.: 233,191

[52] U.S. Cl. .............................................. 95/12
[51] Int. Cl. .............................................. B43l 13/18
[58] Field of Search .............................................. 95/12

[56] References Cited

UNITED STATES PATENTS 3,640,193 2/1972 Linde .............................................. 95/4.5
3,648,578 3/1972 Ritchie .............................................. 95/12
3,458,253 7/1969 Hansen .............................................. 355/19

*Primary Examiner*—John M. Horan
*Attorney*—Carlton Hill, Lewis T. Steadman et al.

[57] ABSTRACT

Apparatus for the optical drafting of very small figures with line widths and lengths of for example, on the order of 1.0 $\mu m$ or less, by means of an optical light beam projected from a stationary optical system upon a photoplate movable in the plane thereof, to trace lines thereon with said light beam, the latter having a rectangular transverse cross-section and rotatable about the beam axis whereby a pair of parallel edges of the beam are maintained substantially parallel to the direction of movement of the photoplate.

18 Claims, 5 Drawing Figures

LIGHT-OPTICAL APPARATUS FOR DRAFTING VERY SMALL FIGURES WITH VERY FINE LINE WIDTHS AND/OR EXTREMELY SHORT LINE LENGTHS

BACKGROUND OF THE INVENTION

The invention is directed to an apparatus for the optical drawing or drafting of very small figures having line widths and/or line lengths, for example, on the order of 1.0 μm or smaller, particularly for use in the production of masks and the like for semi-conductor component elements. With the continual miniaturizing employed in semi-conductor techniques in order to obtain greater and greater information densities, some form of automatically controlled optical drafting instruments are required. Such high information densities are required, for example, in the production of masks for semi-conductor component elements, integrated circuits and the like. In instruments of this type, employing a light beam or spot as the drawing medium, very high requirements must be met to achieve the desired results. Not only must the light spot be exceedingly small but it must also have a sharp and clear outline. In addition, a constant exposure time must be maintained throughout the movement of the light spot irrespective of changes or variations in the rate of movement thereof. Methods employing light spots of circular shape as the drawing medium fail to satisfactorily meet the requirements, the principle disadvantage being the fact that in forming a line therewith exposure will be considerably greater along the center of the line than at its edges, resulting in the production of a line which does not have sharp, clear edges or outlines.

BRIEF SUMMARY OF THE INVENTION

The present invention thus is directed to apparatus, which eliminates the disadvantages of prior art methods and structures, enabling the production of extremely fine figures having very fine but sharp outlines, and with uniform exposure throughout the area of the photo-plate receiving the same.

The problem presented is solved in accordance with the invention by employing a light beam traversing a photo-plate in which the configuration of the light beam, and thus the light spot formed thereby on the photo-plate, has a rectangular shape with two parallel side edges of the light spot extending parallel to the relative direction of movement of the light spot and the photo-plate, with such relative movement being produced by a translation movement of the photo-plate relative to the stationary optical system. An optical rotational movement of the light beam about its axis is effected whereby parallelism between the respective parallel side edges and the direction of movement is substantially maintained irrespective of changes in direction of such movement.

A uniform exposure time over the entire line width is obtained as a result of the rectangular configuration of the light beam producing the same as the two parallel side edges of the rectangular configuration of the beam are disposed in parallel relation to the direction of movement resulting from the movement of the photo-plate relative to the light beam. As a result, curves may also be drawn with a substantially uniform exposure time which is of particular importance in the production of masks for integrated circuits and the like and for lateral transistors in which the base contact has an annular or U-shape and completely or partially encircles the emitter.

In the embodiment illustrated, which is a preferred form of the invention, light from a suitable source is passed through a rectangularly shaped slot, which preferably may be adjusted with respect to its length, following which the light beam passes through an ancalary lens, creating a telecentric beam formation, and then through means for effecting a rotation of the beam about its axis. Following emergence of the beam from the rotating means, there may be interposed in the path thereof a first and a second lens arrangement through which the beam must pass before striking the photo-plate upon which the drawing is to be made. The photo-plate is so arranged that the axis of the impacting beam will extend perpendicularly to the plane of the photo-plate with the latter being movable in such plane to effect relative movement of the plate with respect to the light beam and thus trace a line thereof. The beam is automatically so controlled that rotation of the beam and the control of the intensity thereof will be automatically effected in response to the shifting of the photo-plate coupled therewith whereby the desired control of the relationship of the parallel edges of the beam with respect to the direction of movement, and the exposure time on the photo-plate will be uniform throughout the relative movements between plate and beam.

The rotating means conveniently and preferably includes a Dove prism which is so constructed that rotation of the prism about an axis of a light beam passing therethrough will result in a rotation of the light beam about its axis. Thus, the interposition of such a crystal in the path of the light beam here involved, a suitable rotation of the light beam may be effected merely by rotation of the crystal, to maintain the parallelism between the side edges of the light beam and direction of movement of the plate relative to the light beam.

As the entire drawing area normally involved is relatively quite small in applications of the invention such as here described, and as a like amount of information can be accommodated on less and less surface area, with equivalent information density, it is advantageous in the present instance to maintain the general optical system, and thus the axis of the beam, stationary and derive the necessary tracing movements between the beam and the photo-plate by movement of the photo-plate in its plane. In such event, the masses being moved are reduced to a minimum due to the relatively small mass of the photo-plate as compared with the optical system. Consequently, accurate and fine control of the line formation with higher drawing speeds are achieved, which also results from the fact that the light beam, disposed on a stationary axis, can be rotated around such axis, thus eliminating a rotary movement of the entire optical system and the accompanying relative large masses developing large inertia forces.

While an optical rotation of the light beam could also be obtained by the use of a plurality of mirrors disposed on the beam path, in such an arrangement the mirrors must be very accurately adjusted and likewise very accurately maintained in adjusted positions. The utilization of a prism therefore is particularly advantageous in this connection although it requires a telecentric beam path.

The first and second lens arrangements may be considered, when taken together, to correspond to a microscope in which the first lens arrangement represents the eye piece and the second lens arrangement the objective.

Thus, for the drawing of small figures on the order of magnitude of a few μm, the optical reduction of the light aperture to the dimensions involved may be utilized to effect the desired recordation, and suitable optical systems therefor are available. The principle of reproduction of an aperture slot or the like can thus be utilized to produce the desired recordation.

While a rotary prism can be disposed either ahead of the ocular or of the objective, in connection with the use of a compound microscope, angular inaccuracy in the ground surfaces of the prism and inaccuracies of mounting will have a minimal affect when the prism is provided ahead of the ocular. This results from the fact that the prism is then nearest to the aperture slot which defines the recordation spot so that the effect on the beam will be minimal. In accordance with the invention, the prism is therefore advantageously disposed ahead of the first lens arrangement.

As previously mentioned, the recording beam should extend telecentrically through the rotary prism and this is accomplished in the present invention by use of a front or ancilary lens which is disposed ahead of the rotary prism.

With a microscope optical system, the entire enlargement or entire reduction, respectively, is represented by the product of the objective enlargement or reduction and the ocular enlargement or reduction. The change in size due to the ocular may be represented by the ratio $v_o\ k = s_k\ f_1$ wherein $s_k$ is the conventional visual range range of 250 mm and $f_1$ is the focal length of the oculator in mm. The recordation ratio of the two lens arrangements, as applied to the telecentric beam, is determined in accordance with the ratio $v_t = f_2\ f_1$ in which $f_2$and $f_1$ are the focal lenghts of the respective lens arrangements. The arrangement according to the present invention thus corresponds to a microscope where $v_t = v_o\ k$.

This therefore would mean that the front or ancilary lens, disposed ahead of the prism, would have a focal length of $f_2$=$s_k$ = 250mm. Such an optical recordation system thus has the particular advantage of not only having a recordation ratio for certain objective and ocular arrangements but as in a normal microscope, for all such arrangements in which the ratio is equal to the product of ocular and objective lens. Furthermore, the invention thus has the technical production advantage that a single constructional development is satisfactory for a large range of operational values as a result of the utilization of the principle of a constant overall length within the operational values involved in the microscope function.

In a further development of the invention, there may be utilized a glare prevention diaphragm, a heat filter, a color filter, a condenser and two grey filters, all of which may be disposed in the path of the beam between the light source and the aperture slot defining the beam configuration. The color filter is provided for reducing chromatic recording faults while the two grey filters enable a control of the brightness of the 'ight beam as hereinafter described in detail. The disposition of a light condenser between the aperture slot and the light source is operative to concentrate the emitted light on the ocular. Preferably, a mercury lamp is utilized as the light source. In this case the ocular is the imput or entry lens arrangement for the light beam and if desired could be provided at the output side thereof with an additional aperture.

BRIEF DESCRIPTION OF THE DRAWINGS

In the drawings wherein like reference characters indicate like or corresponding parts.

DETAILED DESCRIPTION OF THE INVENTION

Figure 1:
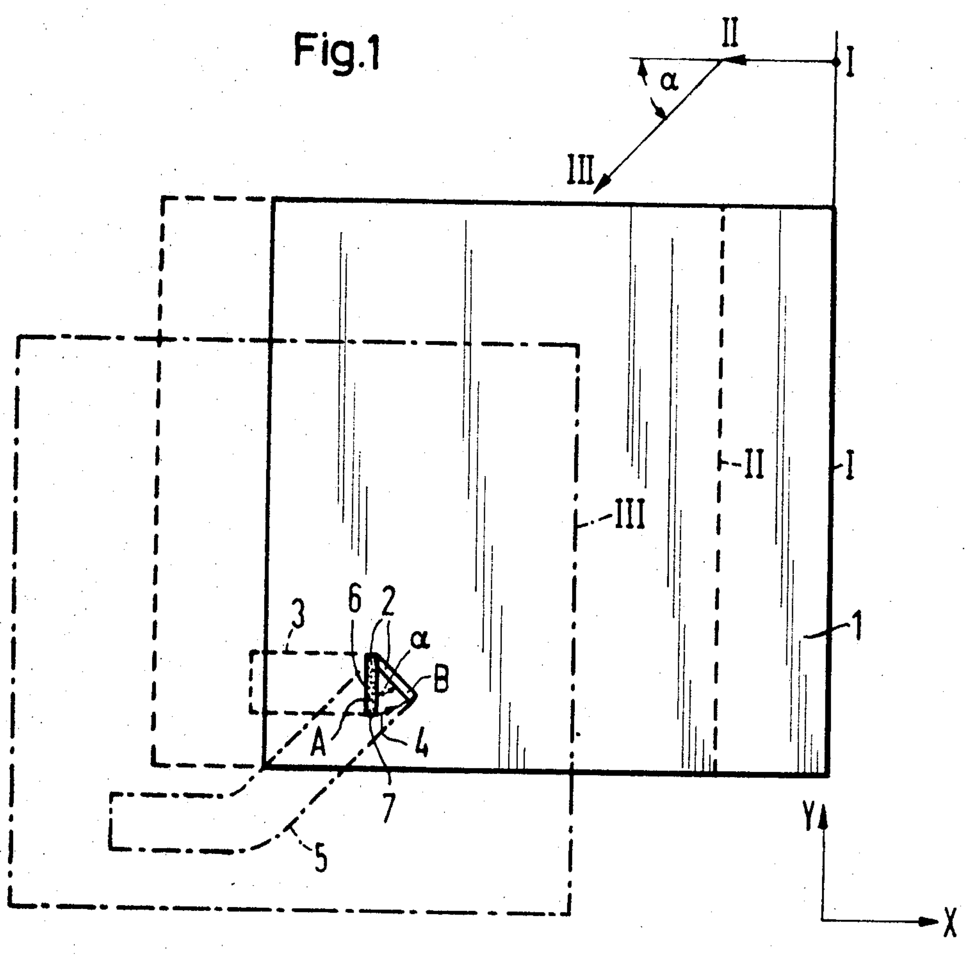
FIG. 1 is a schematic plan view of a photo-plate or the like illustrating the relationship of the recording beam with respect thereto.

Referring to the drawings and more particularly to FIG. 1, the reference numeral 1 designates a photoplate i.e. a light sensitive plate, upon which a line is intended to be recorded by means of a light spot 2, the photolate 1 being suitably carried by a movable supporting table or plate which is provided with means for effecting a movement of the photoplate in orthogonal directions, for example directions $x$ and $y$ respectively resulting in a traveling of the light spot across the face of the plate. The outline of the photoplate illustrated in FIG. 1 and designated by the numeral I represents a first position of the photoplate while the dashed lines represent a second position designated by the roman numeral II and the dot dash line a third position designated by the reference numeral III. The light spot 2 is illustrated as having respective dimensions 6 and 7, the dimension 6 defining the width of the line to be formed, and thus may appropriately be termed the width of the spot even though it is il'ustrated as being considerably greater than the dimension 7, which for purposes of identification may be termed the height of the spot. As hereinafter described, the dimension 7 is fixed or constant while the dimension 6 may be suitably adjusted or controlled, for example automatically.

Assuming the plate 1 is in the position I, the light spot 2 will strike or impact the face of the plate with a rectangular configuration as designated by the letter A. As the supporting table is shifted in the $x$ direction, the photoplate 2 will eventually reach position II in which case a line 3 would have been produced on the plate, as schematically illustrated in broken lines. By effecting an optical rotation of the beam on its axis, the image of the aperture slot produced by the light spot 2 will be rotated into the position designed by the reference letter B, the rotation from position A to position B being indicated by an arrow 4 with a the angle, formed by the physically longitudinal axis of the light spot 2 (along the dimension 6 of the beam) in the positions A and B defining an angle designated by $\alpha$. Assuming that the photoplate 2 is then brought into position III, by means of suitable translation movement of the photoplate supporting table, a line schematically represented by the dot dash lines 5 will be exposed on the photoplate, resulting from the respective movements of the plate in the $x$ and $y$ directions and as a result of the rotation of the light spot 2, with the elongated area defined by the righthand portion of the dot dash lines 5 extending perpendicular to the longitudinal axis of the light spot, then in position B.

It will be appreciated that it is, of course, also possible to effect a translation movement of the photoplate 1 simultaneously with rotational movement of the light spot 2, with the latter being rotated in a direction to maintain an edge 7, defining the height of the spot substantially tangent to the curve which is to be drawn.

It will be appreciated from the above that the present invention therefore is directed to a method in which a light beam is projected on a stationary axis, following suitable shaping thereof to a rectangular cross sectional configuration of predetermined size, upon a cooperable photoplate, with the relative travel of the beam across the plate being achieved by effecting movement of the plate relative to the beam axis and with a pair of parallel edges of the beam maintained substantially parallel to the direction of movement of the plate. This is accomplished by effecting an axial rotation of the beam with respect to the plate in correspondence to changes in the direction of movement of the plate.

Figure 4:
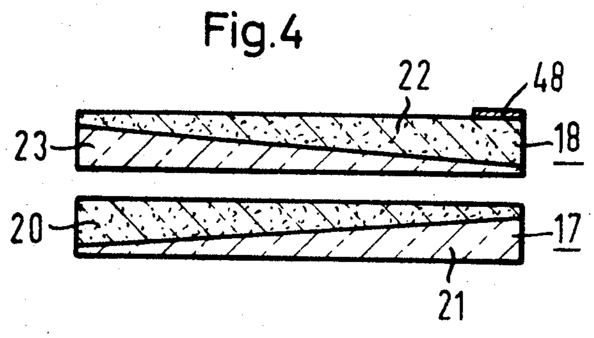
FIG. 4 is a sectional view taken approximately on the line IV—IV of FIG. 3.
Figure 2:
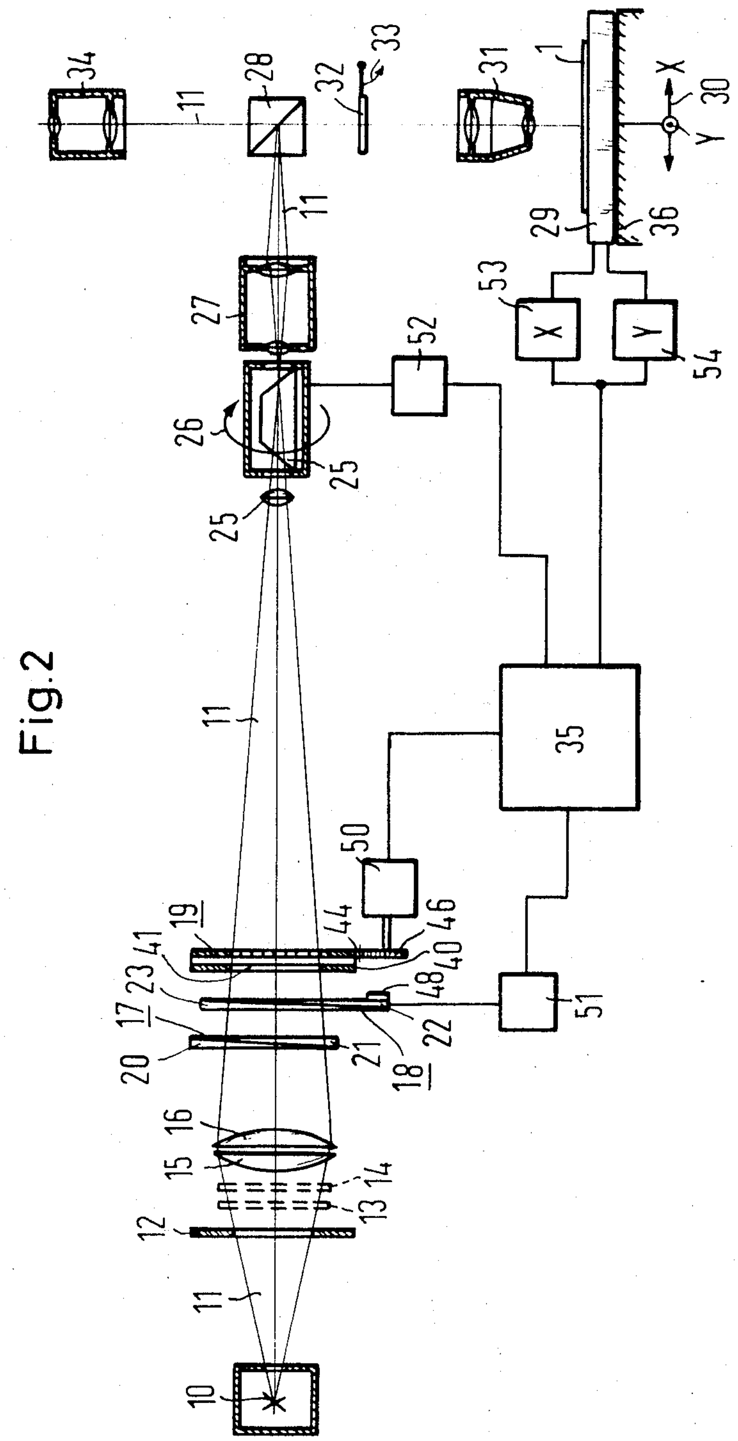
FIG. 2 is a schematic figure illustrating apparatus constructed in accordance with the present invention.
Figures 3, 5:
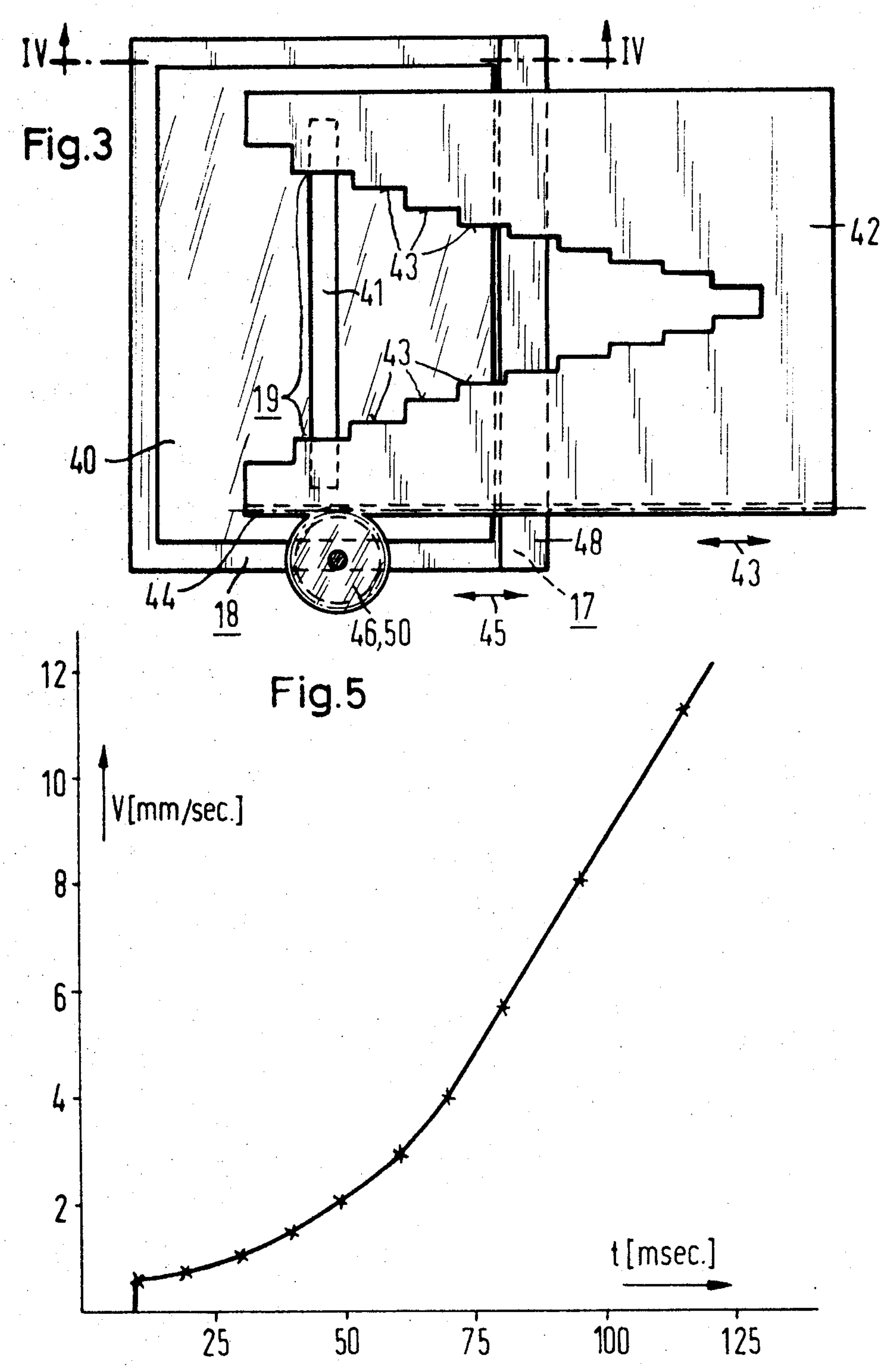
FIG. 3 is an elevational view of the beam-defining aperture slot and associated structure as viewed on the optical axis of the structure, looking rearwardly toward the light source.
FIG. 5 represents a chart illustrating the relation between table and photo-plate speed and corresponding adjustment of the light intensity.

FIGS. 2–4 diagrammatically illustrate an apparatus for practicing the method of the invention.

Referring to FIGS. 2, the reference numeral 10 designates a mercury lamp having, for example, a power of 200 watts and whose illuminated field is 2.2 by 0.6 millimeters, with the light rays 11 emerging therefrom being illustrated as passing through a glare prevention diaphragm 12, a heat filter 13, a color filter 14 for reducing chromatic image faults, two condenser lens 15 and 16, and two grey filters 17 and 18, the grey filters being operative to enable a control of the light intensity by relative positioning of the two filters with respect to the operative or effective aperture slot 19 defining the cross-sectional configuration of the light beam, with such slot being disposed following the grey filters, which slot, as previously mentioned, can be varied in size only with respect to the width dimension 6.

As illustrated in FIG. 4, the respective grey filters 17 and 18 comprise respective neutral or grey wedges 20 and 22 and respective transparent wedges 21 and 23 having normal light transmission characteristics. Each grey wedge is disposed in antiparallel relation with respect to the associated grey wedge, as clearly illustrated in FIG. 4, the respective outer surfaces of each pair of grey and neutral wedges extending parallel to one another and parallel to the corresponding edges of the associated filter. Consequently, by a lateral shifting of the two filters relative to one another, as viewed in FIG. 4, the effective combined thickness of the two grey wedges extending across the aperture 19 may be varied, while maintaining a uniform combined thickness of the grey wedges across the area of the aperture slot 19 to provide an infinitely variable control of the light intensity at the aperture slot 19. The grey filter 17, for example, may be manually adjustable for determining the overall light intensity, while the filter 18, as subsequently described, may be controlled automatically.

Condenser lenses 15 and 16 which concentrate the light on the aperture slot 19 are, in the embodiment described, disposed at a distance of 140 mm from the light source 10 and have a focal length of 76 mm. In like manner, the aperture slot 19 is disposed at 53 mm from the condenser lens 15 and at a distance of 193 mm from the light source 10.

FIG. 3 illustrates details of the structure forming the aperture slot 19, the means for varying the length of such slot and the arrangement of the grey filters 17 and 18 with the structure being illustrated in elevation, as viewed on the axis of the beam, looking rearwardly (toward the light source) with FIG. 4 representing a sectional view of the grey filters, looking upwardly, approximately on the line IV—IV as viewed in FIG. 3.

The aperture slot 19 is formed by an opaque plate 40, provided with an elongated slot 41 therein of predetermined length with is cooperable with an opaque movable cover plate 42, the latter having a more or less V-shaped notch therein formed by a plurality of stepped edges 43, which plate may be shifted laterally as viewed in FIG. 3 to dispose a selected pair of oppositely disposed stepped edges 43 across the slot 41. Such movement of the plate 42 may be effected in the directions indicated by the double arrow 43' by any suitable means, as for example, a stepping motor 50 which is operatively connected thereto through a pinion 46, carried by the motor drive shaft, and a gear rack 44 mounted on the adjacent edge of the plate 42. Thus, by shifting the plate 42, an adjustment of the effective width or elongation of the aperture slot 19 may be made, such dimension becoming smaller as the plate 42 is shifted to the left as viewed in FIG. 3. The plate 40 with the elongated slot 41 therein and the cover plate 42, thus cooperate to define the effective size of the aperture slot 19, and thus the size of the light beam and spot formed thereby on the photoplate.

The grey filters 17 and 18 likewise can be shifted relative to the slot 41, in the directions indicated by the double arrow 45, by suitable means such as a similar stepping motor, not illustrated in FIG. 3 but diagrammatically illustrated in FIG. 2 and designated by the reference numeral 51. As illustrated in FIGS. 3 and 4, the thicker end edge of the neutral wedge 22 of the filter 18 may be provided with an opaque strip 48 which, by suitable movement of the filter 18 to its extreme lefthand position as viewed in FIG. 3, may be positioned across the slot 41 to effectively prevent the passage of light therethrough.

As mentioned, this movement of the filter may be effected through a suitable stepping motor, in cooperation with a suitable rack and pinion, not illustrated.

Disposed to receive light passing through the aperture slot 19 is a front or ancilary lens 24 having a focal length of 250 mm and disposed at a distance of 140 mm from the aperture slot 19. Following the lens 24, in the direction of the light travel, is a rotary prism 25, illustrated as being a Dove prism which receives the light beam following its passages through the lens 24, with the latter causing the telecentric beam path with respect to the prism 25. The beam thus can be rotated by means of a rotation of the prism 25, such rotation being indicated in FIG. 2 by the arrow 26.

Disposed to receive light passing through the prism 26 is an ocular 27 forming a first lens arrangement or system, having a focal length of 25 mm and located at a distance of 82 mm from the lens 24. The ocular 27 is provided with an aperture of 2.5 mm in diameter and the mechanical tube length is 170 mm. A divider or separator cube 28 having sides of 15 millimeter in length is disposed to intersect the beam 11 after passage through the ocular 27 and reflect the same through an angle of 90° in a downward direction toward the photoplate 1, as viewed in FIG. 2. The photoplate 1 is suitably mounted on an air-supported table 29 with the plane of the photoplate disposed at right angles to the axis of the beam 11 striking the same, the photoplate being disposed at an optical distance of 307 mm from the lens 24. The supporting structure 36 as well as the table plate 29 are only schematically illustrated in FIG. 2, in which the table plate 29 is air supported and can be shifted in its plane as indicated by the arrow cross 30, in which the Y axis is perpendicular to the plane of the drawing.

Disposed above the photoplate 1 is a second lens arrangement or system, i.e., the objective 31 which, for example, may be of square cross section with a focal length of 17.9 mm and a length of 50 mm. Suitably mounted between the separator cube 28 and the objective 31 may be a suitable photoelement 32 which is mounted and thus may be rotated, as indicated by the arrow 33 in FIG. 2, into or out of the path of the light beam. Disposed above the separator cube 28 on the axis of that portion of the beam extending between the cube 28 and the photoplate 1 is an observation ocular 34, by means of which the configuration and size of the light spot 2 may be viewed to enable a sharp adjustment of the spot in the drawing plane and thus facilitate the sharp adjustment of the light spot on the photoplate 1.

The ocular 27, together with the front lens 24 and the objective 31 represent an optical system which corresponds to those of a similar type microscope. Due to the additional front lens 24 the device has overall characteristics equal to the product of objective and ocular enlargement or reduction respectively.

The light spot 2 thus can be rotated by effecting a rotation of the prism 25 while the relative translation movement between the light spot 2 and the photoplate 1 is effected by movement of the table plate 29. The table plate 29 and the rotary prism 25 are so controlled automatically that two parallel side edges of the light spot 2, for example the edges 7, extend parallel to the direction of movement of the table, with the shape of the light spot being determined by the aperture slot 19 and the width 6 of the spot. Thus the width of the line is determined by the length of the aperture slot 19, the dimension 7 of which is fixed.

As previously mentioned, the grey filter 17 may be used to effect a preadjustment of the brightness or intensity of the light spot and may be manually adjusted, while the grey filter 18 preferably is automatically adjusted in correspondence to the rate of relative movement of the light beam with respect to the photoplate, such that the light intensity, i.e. the light exposure on the surface of the photoplate during scanning by the light beam is uniform. It is therefore desirable that such control of the grey filter 18 be effected automatically.

In order to obtain a rapid and exact, as well as an automatic drawing operation, and in order to guarantee the reproducing ability of the drawn structure, which is of particularly great importance for the direct drawing of patterns for a repeater camera for semi-conductor masks, etc., the rotary prism 25, the adjustment of the aperture slot 19, the grey filter 18 and the table plate 29 preferably are connected with an automatic control device 35 which by means of the respective stepping motors 50 and 51, as well as the stepping motors 52,53 and 54 for the control respectively of the rotary crystal, and X and Y translation movements of the table plate 29, controls the various functions.

The width of the light spot 2 and thus the width of the lines drawn thereby are determined by the control of the effective length of the aperture slot 19, as adjusted over the stepping motor 50. Rotation of the prism 25 by means of the stepping motor 52 and the shifting of the table plate 29 by means of the stepping motors 53 in X direction, or 54 in Y direction as indicated by arrow cross 13 will determine the direction of a drawn curved line.

As previously mentioned, the brightness or intensity of the light spot with which the drawing operation is to be effected is adjusted relative to the drawing speed by means of the grey filter 18, and when the device is at rest, the opaque strip 48, carried at the side of the neutral wedge 22, will completely close off the passage of light through the aperture slot 19, thereby avoiding exposure of the photoplate during periods at rest.

Likewise, as previously mentioned, the drawing speed is determined by the movement of the table plate 29 and it will be appreciated that the stepping motors 53 and 54 which move the table plate, must of necessity start with a relatively low stepping speed and slowly brought up to the highest speed. As the grey filter 18 must follow step by step, under action of the motor 51, the corresponding table speed, increase in the table speed is initially determined by the stepping speed V of the grey filter motor 51 when it is, for example, lower than the stepping speed of the motors 53,54. Thus, the course of the table speed, in dependence upon the time t, will approach the curve illustrated in FIG. 5 in which each of the cross points along the curve represent a shift step of the grey filter 18, and as a result of which a minimum time, for example 10 ms, is utilized in bringing the tables up to desired speed.

It will be appreciated from the above disclosure that various immaterial changes be made in the construction without departing from the spirit of the invention.

We claim:

1. A device for the optical drafting of very small figures with line width and/or line lengths, for example on the order of 1.0 $\mu$mm or less, by means of an optical light system, particularly for use in the production of masks for semi-conductor component elements and the like, comprising means including an aperture slot for producing a light beam having a stationary axis, a rectangular cross-sectional configuration and predetermined size, means for projecting said beam in the form of an image of the aperture slot upon a cooperable photoplate, a movable table for supporting such a photoplate with the axis of the impacting beam extending perpendicular to the plane of such a plate, means for moving the supporting table to move such a photoplate, in its plane, relative to the axis of the impacting beam to optically trace a correspondingly shaped line on such a plate, means for rotating the light beam and thus said image about its axis in correspondence to changes in direction of movement of the table, for maintaining a pair of parallel edges of the beam image substantially parallel to the direction of movement of said table and such a photoplate thereon, and means responsive to the movement of said table for controlling said beam-rotating means.

2. A device according to claim 1, comprising in further combination, a front lens disposed on the axis of said light beam between said aperture slot and said beam rotating means, operative to create a telecentric beam path at said beam rotating means, a first and a second lens arrangement disposed on the axis of said beam between said rotating means and said table.

3. A device according to claim 1, wherein the rotating means is a Dove prism.

4. A device according to claim 1, wherein the optical characteristics of the first and second lens arrangements taken together correspond to the characteristics of a microscope.

5. A device according to claim 1, corresponding in further combination, a glare prevention diaphragm, a heat filter, a color filter, a light condenser and two gray filters disposed on the beam axis between the light source and the aperture slot.

6. A device according to claim 5 wherein each of the two gray filters comprises a neutral or gray wedge positioned in planes normal to the beam direction, whereby the neutral wedges are positioned antiparallel with respect to each other and are shiftably in their respective planes relative to a fixed dimension of the aperature slot whereby light permeability through the filters can be varied.

7. A device according to claim 2, comprising in further combination, light deflection means interposed on the beam axis between the first and the second lens arrangements.

8. A device according to claim 7, wherein said deflection means deflects the beam through 90°.

9. A device according to claim 7, comprising in further combination, a photo cell which can be rotated into the beam path between the second lens arrangement and the reflecting means, for use in connection with control of the brightness of the light beam.

10. A device according to claim 9, comprising in further combination an observation ocular disposed on the axis of the impacting beam extending between the objective and the light reflection means at the opposite side of the latter, being in the form of a light divider, for use in effecting a sharp adjustment of the light beam.

11. A device according to claim 1, wherein said table is air supported on a base member, the table having means for supporting a photoplate thereon.

12. A device according to claim 6, wherein one of the two gray filters is controlled in relation to the speed of the light beam by an automatic control device whereby the same exposure results in per unit of surface of the photoplate during scanning by the light beam during a drawing operation and that during a state of rest, the passage of light through the aperture slot is prevented.

13. A device according to claim 12, wherein the control of the other one of the two gray filters is effected manually, for providing a preadjustment of the brightness.

14. A device according to claim 6, wherein the rotary means, the aperture slot, one of the two gray filters and the supporting table are operatively connected with an automatic control device operative to control the operation of the respective components.

15. A device according to claim 14, wherein said beam rotating means comprises a prism, the rotation of which, the change of the aperture length, the automatic shifting of the one of the two gray filters, and the shifting of the air supported table in its plane are effected by means of respective stepping motors.

16. A device according to claim 1, wherein a stage aperture construction is provided for changing the length of the aperture slot, which can be shifted relative to the slot and which is connected with an automatic control device.

17. A device according to claim 1, wherein the foca' distance of the front lens is 250 mm.

18. A device according to claim 15, wherein a stage aperture construction is provided for changing the length of the aperture slot, which can be shifted relative to the slot and which is connected with an automatic control device.

* * * * *